United States Patent
Maguran, Jr.

[11] Patent Number: 5,579,229
[45] Date of Patent: Nov. 26, 1996

[54] TEMPERATURE RESPONSIVE SUSPENSION SYSTEM CONTROL

[75] Inventor: Gene A. Maguran, Jr., West Bloomfield, Mich.

[73] Assignee: General Motors Corporation, Detroit, Mich.

[21] Appl. No.: 411,184

[22] Filed: Mar. 27, 1995

[51] Int. Cl.⁶ ................................................. B60G 17/015
[52] U.S. Cl. ...................................... 364/424.05; 280/707
[58] Field of Search ............................... 364/424.05, 557; 280/702, 707, 840

[56] References Cited

U.S. PATENT DOCUMENTS

| | | | |
|---|---|---|---|
| 4,674,608 | 6/1987 | Morris et al. | 188/290 |
| 5,000,478 | 3/1991 | Kerastas | 280/707 |
| 5,104,144 | 4/1992 | Bethell | 280/707 |
| 5,184,703 | 2/1993 | Van Zeggeren | 188/319 |
| 5,200,895 | 4/1993 | Emura et al. | 364/424.05 |
| 5,255,191 | 10/1993 | Fulks | 364/424.05 |
| 5,396,973 | 3/1995 | Schwemmer et al. | 188/299 |

*Primary Examiner*—Michael Zanelli
*Attorney, Agent, or Firm*—Anthony L. Simon

[57] ABSTRACT

A suspension system control method comprising the steps of: measuring an ambient temperature outside a vehicle; measuring a relative velocity of a suspension system damper; responsive to the relative velocity and the ambient temperature, estimating a damping fluid temperature of damping fluid within the actuator; comparing the estimated damping fluid temperature to a predetermined threshold; if the damping fluid temperature is not above the predetermined threshold, constraining an actuator command to a cold temperature maximum value, wherein the cold temperature maximum value is less than a corresponding normal non-cold temperature maximum value for the actuator command; and outputting the actuator command to the damper, wherein the occurrence of suspension noise and harshness during cold temperature operation of the vehicle is minimized.

6 Claims, 3 Drawing Sheets

TEMPERATURE RESPONSIVE SUSPENSION SYSTEM CONTROL

The subject of this application is related to the subject of co-pending U.S. patent applications, Ser. Nos. 08/410,794, 08/410,795, 08/410,788 and 08/409,411, all filed concurrently with this application, all assigned to the assignee of this invention and all having disclosures that are incorporated herein by reference. This invention is related to the subject of U.S. patent application, Ser. No. 08/358,925, filed on Dec. 19, 1994, now U.S. Pat. No. 5,510,988 and assigned to the assignee of this invention.

This invention relates to a temperature responsive suspension system control.

BACKGROUND OF THE INVENTION

Known variable force suspension systems include variable force shock absorbers and/or struts (dampers) that provide suspension damping forces at a magnitude controllable in response to commands provided by a suspension system controller. Some systems provide control between two damping states and others provide continuously variable control of damping force. Example systems are described in U.S. Pat. Nos. 5,235,529, 5,096,219, 5,071,157, 5,062,657, 5,062,658, all assigned to the assignee of this invention and the disclosures of which are incorporated herein by reference.

Many variable force dampers use a damping fluid that is sensitive to changes in ambient temperature. Typical damping fluids exhibit an increase in viscosity as the temperature falls below a certain level, for example, below −20 degrees C. As the viscosity of the fluid increases, the force versus relative velocity performance profile of the damper changes, resulting in increased damping force from the damper for a given relative velocity. This change in performance profile of the damper can be noticed by the vehicle operator in the form of increased road and suspension noise and a selective decrease in ride comfort.

SUMMARY OF THE INVENTION

A temperature responsive suspension system control in accordance with the present invention is characterized by the features specified in claim 1.

Advantageously, this invention provides a suspension system control that minimizes the effect of increased viscosity of low temperature damper fluid on vehicle ride comfort.

Advantageously, this invention provides control for a variable force suspension system that minimizes the occurrence of cold weather suspension system noise caused by the increased viscosity of the damper fluid in cold ambient conditions.

Advantageously, this invention provides a suspension system control for a variable force suspension system that limits the commanded force of a variable force damper responsive to the temperature of the damping fluid within the damper to prevent the generation of undesirable suspension harshness or noise due to cold damping fluid.

Advantageously, in a preferred implementation of this invention, a suspension system control is provided according to the steps of determining an ambient temperature outside the vehicle, determining, responsive to a sensor input, a signal indicative of a relative velocity between a body and wheel of the vehicle, responsive to a determined ambient temperature and relative velocity, estimating a temperature of the damping fluid within the variable force damper, comparing the estimated temperature to a predetermined threshold, if the estimated temperature is below the predetermined threshold, developing a cold temperature actuator command and applying the cold temperature actuator command to the variable force actuator wherein the cold temperature actuator command is restricted to a commanded damping force level lower than a normal operation maximum damping force level.

Advantageously, another preferred implementation of this invention comprises a controllable suspension system including means for sensing ambient temperature, a controllable variable force damper with a piston and a cylinder, wherein the controllable variable force damper is responsive to a damper command, means for determining a relative velocity of the piston and cylinder of the variable force damper, a microcomputer controller comprising means, responsive to the relative velocity and the ambient temperature, for estimating a damping fluid temperature of damping fluid within the actuator, means for comparing the estimated damping fluid temperature to a predetermined threshold and means for indicating a cold temperature operation of the damper if the estimated damping fluid temperature is not above the predetermined threshold. When cold temperature operation is indicated, the damper may be controlled to minimize the occurrence of audible noise and suspension harshness caused by cold temperature operation of the damper.

BRIEF DESCRIPTION OF THE DRAWINGS

The present invention will now be described, by way of example, with reference to the accompanying drawings, in which.

DETAILED DESCRIPTION OF THE INVENTION

Figure 1:
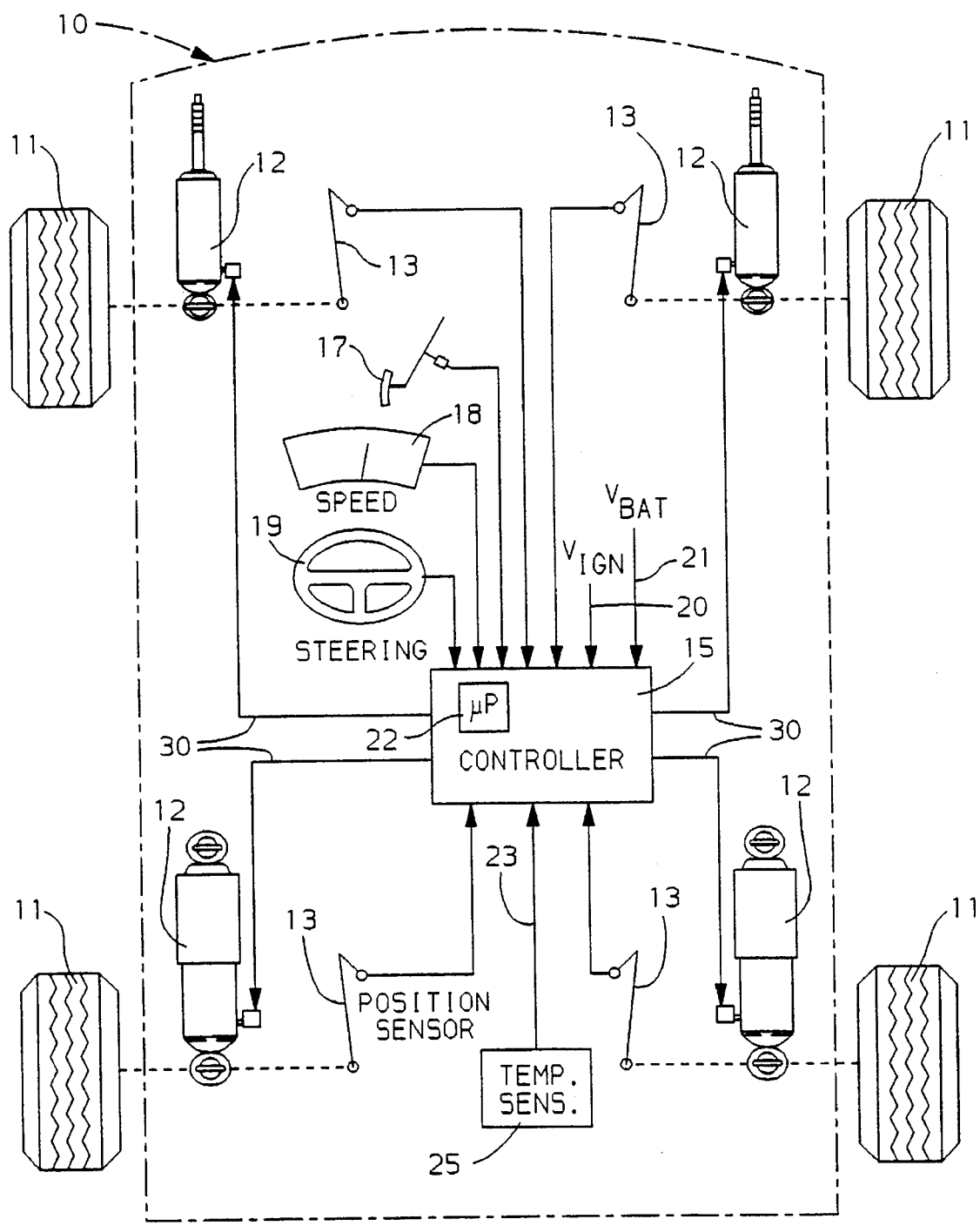
FIG. 1 illustrates an apparatus according to this invention.

Referring to FIG. 1, an example apparatus for implementation of this invention is shown and, in general, comprises a vehicle body 10 supported by four wheels 11 and by four suspensions including springs of a known type (not shown). Each suspension includes a variable-force real time controllable damper 12 connected to exert a vertical force between wheel 11 and body 10 at that suspension point. Although many such suspension arrangements are known and appropriate to this invention, actuator 12 of this embodiment comprises an electrically controllable, variable force damper in parallel with a weight bearing coil spring in a parallel shock absorber/spring or McPherson strut arrangement. A description of a variable force damper suitable for use as actuator 12 is the continuously variable damper described in U.S. Pat. No. 5,282,645, assigned to the assignee of this invention and the disclosure of which is incorporated herein by reference.

Each corner of the vehicle includes a linear position sensor 13 that provides an output signal indicative of the relative distance between the vehicle wheel and the suspended vehicle body at that corner of the vehicle. Suitable position sensors 13 can be easily constructed by those skilled in the art. The outputs of the position sensors 13 may be differentiated to produce relative body-wheel vertical velocity signals for each corner of the vehicle and may be used as inputs to a suspension system control algorithm.

An example position sensor 13 includes a rotary resistive device mounted to the vehicle body and a link pivotably coupled between both the vehicle wheel and a pivot arm on the rotary resistive device such that the rotary resistive device provides an impedance output that varies with the relative position between the wheel 11 and the corner of the body 10. Each position sensor 13 may further include an internal circuit board with a buffer circuit for buffering the output signal of the rotary resistive device and providing the buffered signal to the controller 15. Suitable position sensors 13 can be easily constructed by those skilled in the art. Any alternative type of position sensor, including transformer type sensors, may be used as position sensor 13.

The outputs of relative position sensors 13 are provided to a controller 15, including a microcomputer 22, which processes the signals to determine the states of vehicle body 10 and wheels 11 and generates an output actuator control signal for each variable actuator 12. These signals are applied from controller 15 through suitable output apparatus to control actuators 12 in real time. Line 23 provides an input signal to controller 15 indicative of ambient temperature outside the vehicle. Input signals for the determination of the output actuator control signals may also be provided to controller 15 by vehicle brake apparatus 17 to provide anticipation of vehicle pitch (lift/dive) and by a vehicle speed sensor 18 and a steering wheel angular position sensor 19 to provide anticipation of vehicle roll. Obtaining such signals is easily achieved through the use of known types of sensors available to those skilled in the art.

In the controller 15, signals from relative position sensors 13 are low-pass filtered through four analog low-pass filters and differentiated through four analog differentiators to provide four relative velocity signals. An example combination of such a low pass filter and differentiator is shown in U.S. Pat. No. 5,255,191, issued Oct. 19, 1993, the disclosure of which is incorporated herein by reference. The resulting relative velocity signals represent the relative velocity between the front left wheel and the front left corner of the body, $RV_1$, the rear left wheel and the rear left corner of the body, $RV_2$, the front right wheel and the from right corner of the body, $RV_3$, and the rear right wheel and the rear right corner of the body, $RV_4$. Each of these relative velocity signals is input to a digital microcomputer 22, which includes an input A/D converter with multiplexed inputs, and each is digitally high-pass filtered within microcomputer 22 by a high pass filter to remove any DC offset introduced by the digitation of the A/D converter. The resulting filtered relative velocity signals are provided as a set of inputs to a control algorithm processor to help determine the output actuator control signals for the vehicle suspension system.

In the suspension system shown, when the vehicle has been standing idle for a period of time, the temperature of the fluid within the variable force dampers obtains the temperature of the ambient environment outside the vehicle. In implementing this invention, therefore, it is assumed that when a vehicle is first started, the temperature of the damping fluid within the variable force damper is equal to the ambient temperature outside the vehicle. As the vehicle is driven, heat is added to the damping fluid within the damper as a result of the damping work being done by the variable force damper.

According to this invention, damping work is determined by multiplying the velocity of the damper piston relative to the damper cylinder times the piston force within the damper, thus allowing an estimate of the rate of heat addition to the fluid within the damper. The relative velocity of the piston with respect to the cylinder is equal to the relative velocity signal referred to above derived from the relative position sensors 13. While the above example description derives the relative velocity signal from relative position sensor 13, the relative velocity signal according to this invention may be derived in any other manner including as the output of a body-to-wheel relative velocity sensor or as an estimation from other sensors.

According to this invention, the temperature of the fluid within the suspension variable force damper is estimated also in response to the rate at which heat is removed from the fluid, which is, according to this invention, a function of the present fluid temperature, the ambient temperature outside the vehicle and some physical constants relating to the damper design such as surface area, materials, etc.

According to this invention, since the starting temperature of the shock fluid is known, the rate of heat input into the shock fluid is estimated and the rate of heat output from the shock fluid is estimated, an estimate of the rate of change of the temperature of the damping fluid for any point in time can be made and used to determine an estimate of the temperature of the damping fluid at any point in time.

It may be assumed that, on the average, all four wheels of the vehicle perform approximately equal amounts of work and, therefore, the temperature estimation need only be made for one sample corner suspension that includes one variable force damper. On the alternative, however, the estimation according to this invention may be made for all four dampers, in which case, the control according to this invention would remain in the low temperature mode until all four dampers have estimated fluid damping temperatures above the required minimum level.

Figure 2:
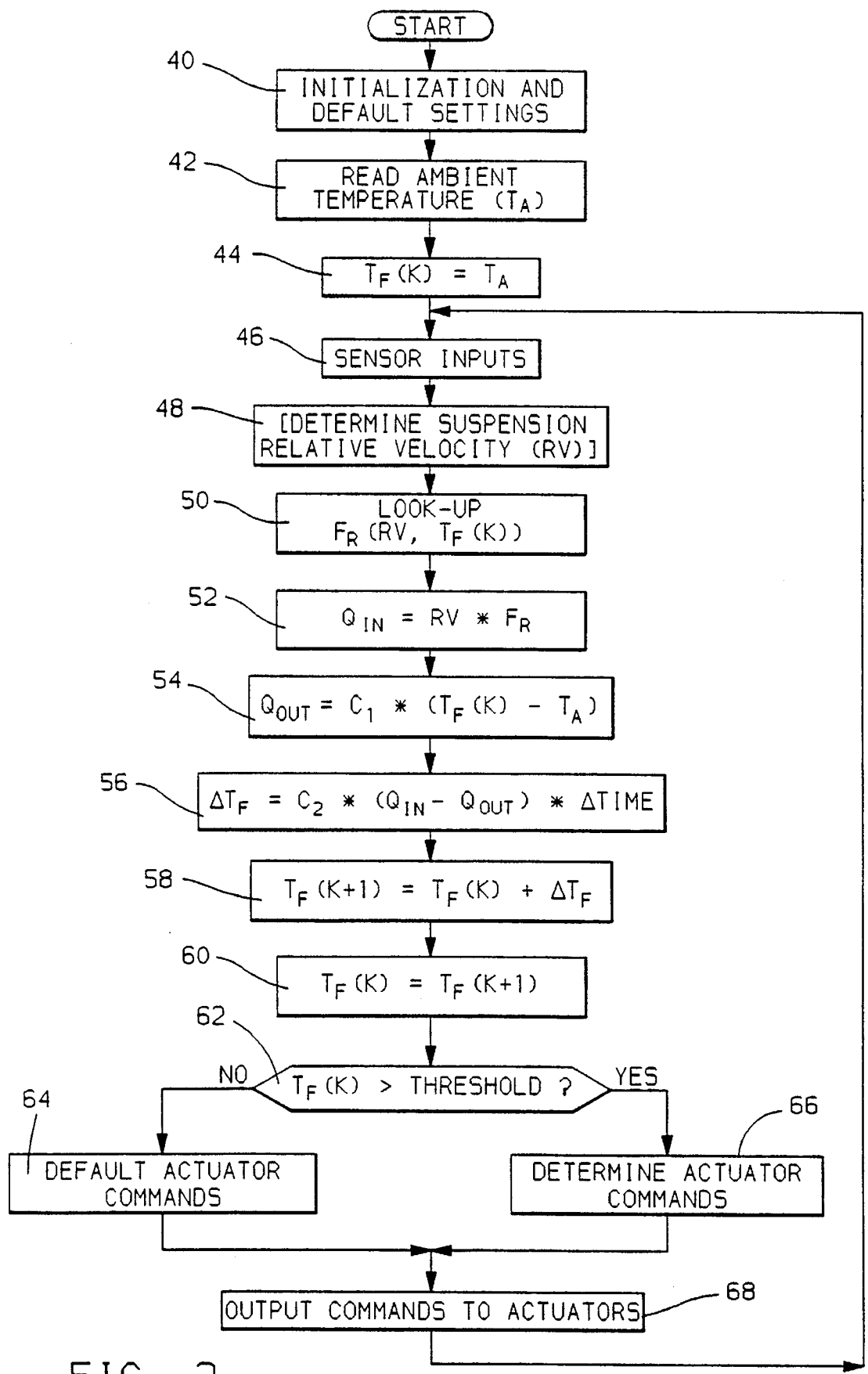
FIG. 2 illustrates an example control structure for a system implementing this invention.

Referring now to FIG. 2, a control diagram for implementing this invention into a suspension system control begins with ignition-on of the vehicle and moves to block 40 where the system initializes and sets default settings, including a default setting for variable force actuator commands. The default setting for the variable force actuator commands may typically be a command equal to the minimum commandable damping force.

After initialization, the routine moves to block 42 where the system reads the ambient temperature, which may be provided either by an external temperature sensor 25 (FIG. 1) or a sensor located within controller 15.

At block 44, the routine then sets the initial damping fluid temperature estimate $T_F(k)$ equal to the read ambient temperature $T_A$. At block 46, the controller reads the sensor inputs from the various suspension system control sensors. If, at block 46, suspension relative velocity is not provided as an input, then suspension relative velocity is determined at block 48, for example through differentiation of the suspension relative position signal provided from a suspension relative position sensor.

At block 50, the relative velocity signal (RV) for the variable force damper and the present estimated temperature $T_F(k)$ are used as input parameters to a look-up table to find the piston force in the damper $F_r$. The look-up table can easily be calibrated by one skilled in the art during design of the system by subjecting a damper to various temperatures and relative velocities, measuring the required force to move the damper at the relative velocity and programming the values into the look-up table. The look-up table 50 may either be used to define step-wise boundaries for the determined force $F_r$, or may be used to determine points within which the input parameters fall, selecting the corresponding damper force for those points and interpolating between those points to find a resultant damper force output. Such interpolation from look-up table values is readily achieved by one skilled in the art.

After the force is determined from the look-up table at block 50, the routine moves to block 52 where it determines the amount of heat generated within the damping fluid, $Q_{in}$, responsive to the relative velocity in the damper and the force determined at block 50, according to the equation:

$$Q_{in}=RV*F_r.$$

Then at block 54, the rate of heat flow output from the damper, $Q_{out}$, is determined responsive to the temperature of the damping fluid, the ambient temperature and a predetermined constant according to the equation:

$$Q_{out}=C_1*(T_F(K)-T_A),$$

where C is a constant for a particular damper and may be easily determined by measuring the rate of heat flowing out of the damper (i.e., change in temperature) in a controlled condition and taking the ratio of that heat outflow to the difference between the damper fluid and the ambient temperature. Then at block 56, an incremental temperature change in the damper fluid is determined responsive to the estimated rate of heat input into the damper and the estimated rate of heat outflow from the damper according to the equation:

$$\Delta T_F=C_2*(Q_{in}-Q_{out})*\Delta Time,$$

where $\Delta time$ is the amount of time elapsed between successive iterations of the control loop shown and $C_2$ is a constant unique for the damper and may be determined by a system designer in a sample damper as the ratio of the change in temperature over estimated $Q_{in}-Q_{out}$ in a given control condition.

The routine then moves from block 56 to block 58 where the estimated damper fluid temperature for the next command determination is updated as:

$$T_F(K+1)=T_F(K)+\Delta T_F.$$

At block 60 then the variable $T_r(K)$ is updated to equal the value $T_F(K+1)$. At block 62, the estimated damper fluid temperature is compared to a threshold value below which the system will remain in the low temperature operating condition. If the value $T_F(K)$ is not above the threshold at block 62, then cold temperature operation of the damper is indicated (i.e., by setting a flag in the computer memory) and the routine moves to block 64 where the actuator commands for the variable force dampers are maintained at the default level. If the estimated temperature of the fluid is greater than the threshold at block 62, then the routine moves to block 66 where the actuator commands are determined according to the normal control routine for determining the actuator commands.

The normal control routine at block 66 may be any control routine known to those skilled in the an including those set forth in the above-mentioned patents or in co-pending patent application Ser. No. 08/410,788.

Figure 3:
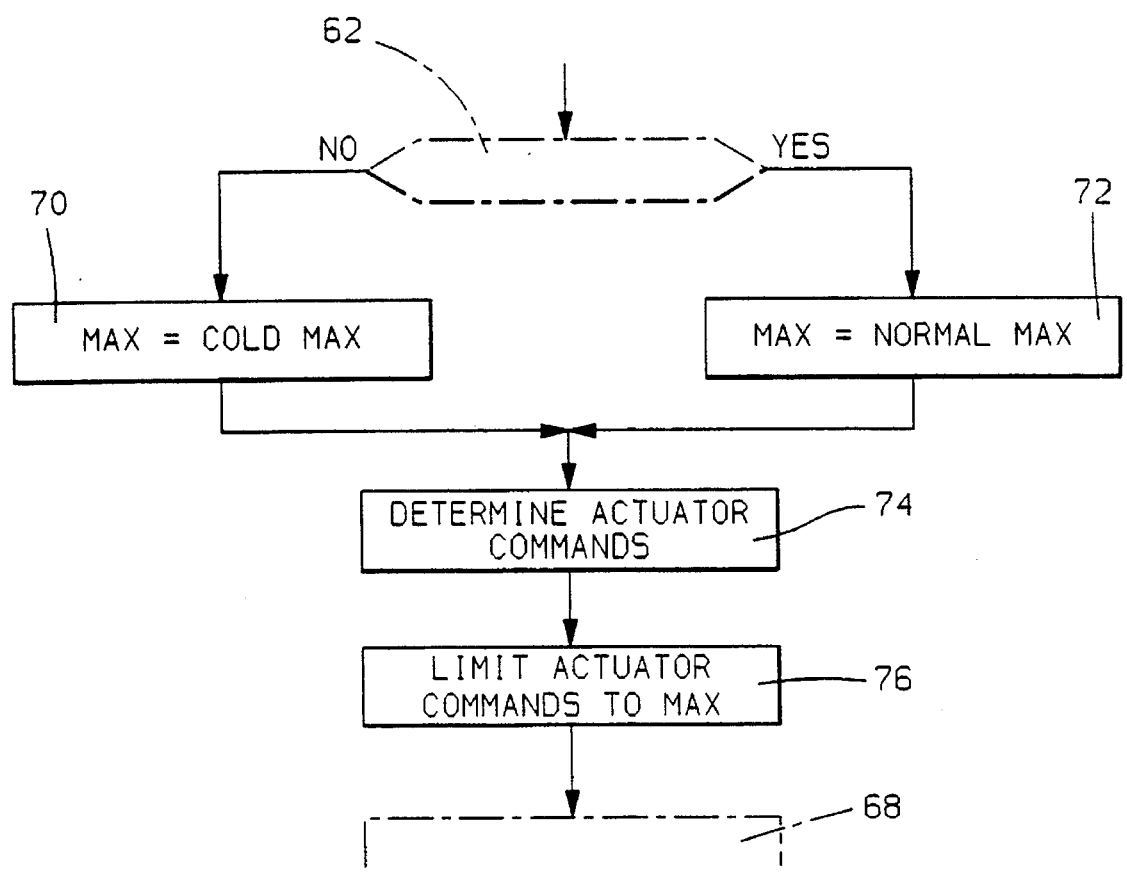
FIG. 3 illustrates a second example control structure for a system implementing this invention.

As an alternative to blocks 64 and 66, the actuator commands can be determined in the manner set forth with respect to FIG. 3, including blocks 70, 72, 74 and 76. At blocks 70 and 72, a value MAX is set to a first value, COLD MAX, if the damper fluid temperature is not above the THRESHOLD. At block 72, if the damper fluid temperature is above the threshold at block 64, the value MAX is set equal to its normal maximum value, NORMAL MAX, for actuator output commands, where COLD MAX is less than NORMAL MAX. The routine then moves to block 74 where it determines the actuator commands in its normal manner (i.e., non-cold weather operation) and then continues to block 76 where the determined actuated commands are limited to the value MAX so that, during cold damping fluid operation, some variation in damper force commands is allowed when MAX is set greater than the minimum possible variable force damper command.

At block 68 (FIG. 2), the commands are output to the variable force suspension actuators and the routine returns to block 46 to update the estimation of the temperature of the damping fluid and determine the next set of actuator commands. Once the damping fluid estimated temperature achieves the threshold level, below which cold temperature commands need not be limited, the estimates for the temperature of the fluid within the damper need not be further updated until the vehicle stops running because it is assumed that the constant work by the variable force dampers during vehicle operation will maintain the damping fluid temperature above the threshold level.

The embodiments of the invention in which an exclusive property or privilege is claimed are defined as follows:

1. A suspension system control method for use in a suspension system including a damper controllable in response to an actuator command, comprising the steps of:

measuring an ambient temperature outside a vehicle;

measuring a relative velocity of a suspension system damper;

responsive to the relative velocity and the ambient temperature, estimating a damping fluid temperature of damping fluid within the damper;

comparing the estimated damping fluid temperature to a predetermined threshold;

if the damping fluid temperature is not above the predetermined threshold, constraining the actuator command to a cold temperature maximum value, wherein the cold temperature maximum value is less than a corresponding normal non-cold temperature maximum value for the actuator command; and outputting the actuator command to the damper.

2. A vehicle suspension system control method comprising the steps of:

determining ambient temperature;

setting an initial damping fluid temperature estimation equal to the ambient temperature, and thereafter iteratively determining a relative velocity of at least one damper of the suspension system;

determining, responsive to the relative velocity and the damping fluid temperature estimation, a damper force value;

estimating heat input to the damper responsive to the relative velocity and the damper force value;

estimating heat outflow from the damper responsive to the estimated damper fluid temperature and the ambient temperature;

determining a change in temperature of the damping fluid responsive to the estimated heat input and the estimated heat outflow;

updating the estimated damper temperature responsive to the estimated damper fluid change in temperature; and if the estimated damping fluid temperature is not above a predetermined threshold, constraining a damper actuator command to a predetermined maximum value for cold temperature operation of the damper to minimize occurrence of suspension noise and harshness during cold temperature vehicle operation.

3. A method of indicating cold temperature operation of a suspension system damper, comprising the steps of:

measuring an ambient temperature outside a vehicle;

measuring a relative velocity of a suspension system damper;

responsive to the relative velocity and the ambient temperature, estimating a damping fluid temperature of damping fluid within the damper;

comparing the estimated damping fluid temperature to a predetermined threshold;

wherein an estimated damping fluid temperature below the predetermined threshold indicates cold temperature operation of the damper.

4. A method of indicating cold temperature operation of a suspension system damper comprising the steps of:

determining ambient temperature;

setting an initial damping fluid temperature estimation equal to the ambient temperature, and thereafter iteratively determining a relative velocity of at least one damper of the suspension system;

determining, responsive to the relative velocity and the damping fluid temperature estimation, a damper force value;

estimating a heat input to the damper responsive to the relative velocity and the damper force value;

estimating a heat outflow from the damper responsive to the estimated damper fluid temperature and the ambient temperature;

determining a change in temperature of the damping fluid responsive to the estimated heat input and the estimated heat outflow;

updating the estimated damper temperature responsive to the estimated damper fluid change in temperature; and if the estimated damping fluid temperature is not above a predetermined threshold, indicating cold temperature operation of the damper.

5. A controllable suspension system comprising:

means for sensing ambient temperature;

a controllable variable force damper with a piston and a cylinder, wherein the controllable variable force damper is responsive to a damper command;

means for determining a relative velocity of the piston and cylinder of the variable force damper;

a microcomputer controller comprising means, responsive to the relative velocity and the ambient temperature, for estimating a damping fluid temperature of damping fluid within the damper, means for comparing the estimated damping fluid temperature to a predetermined threshold and means for indicating a cold temperature operation of the damper if the estimated damping fluid temperature is not above the predetermined threshold.

6. The apparatus of claim 5, also comprising, means for limiting the damper command to a cold temperature maximum value if the estimated damping fluid temperature is not above the threshold.

* * * * *